Patented July 15, 1924.

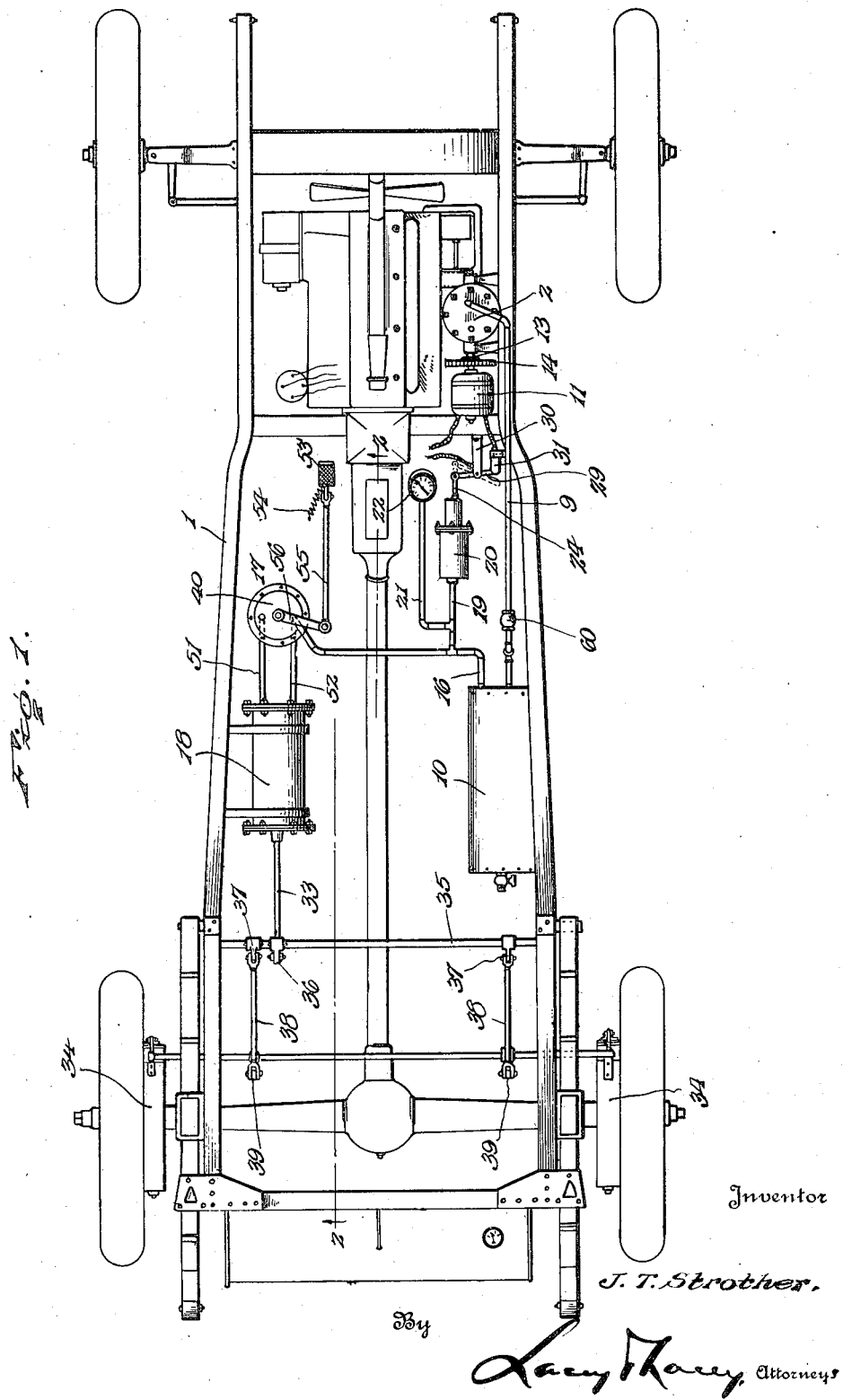

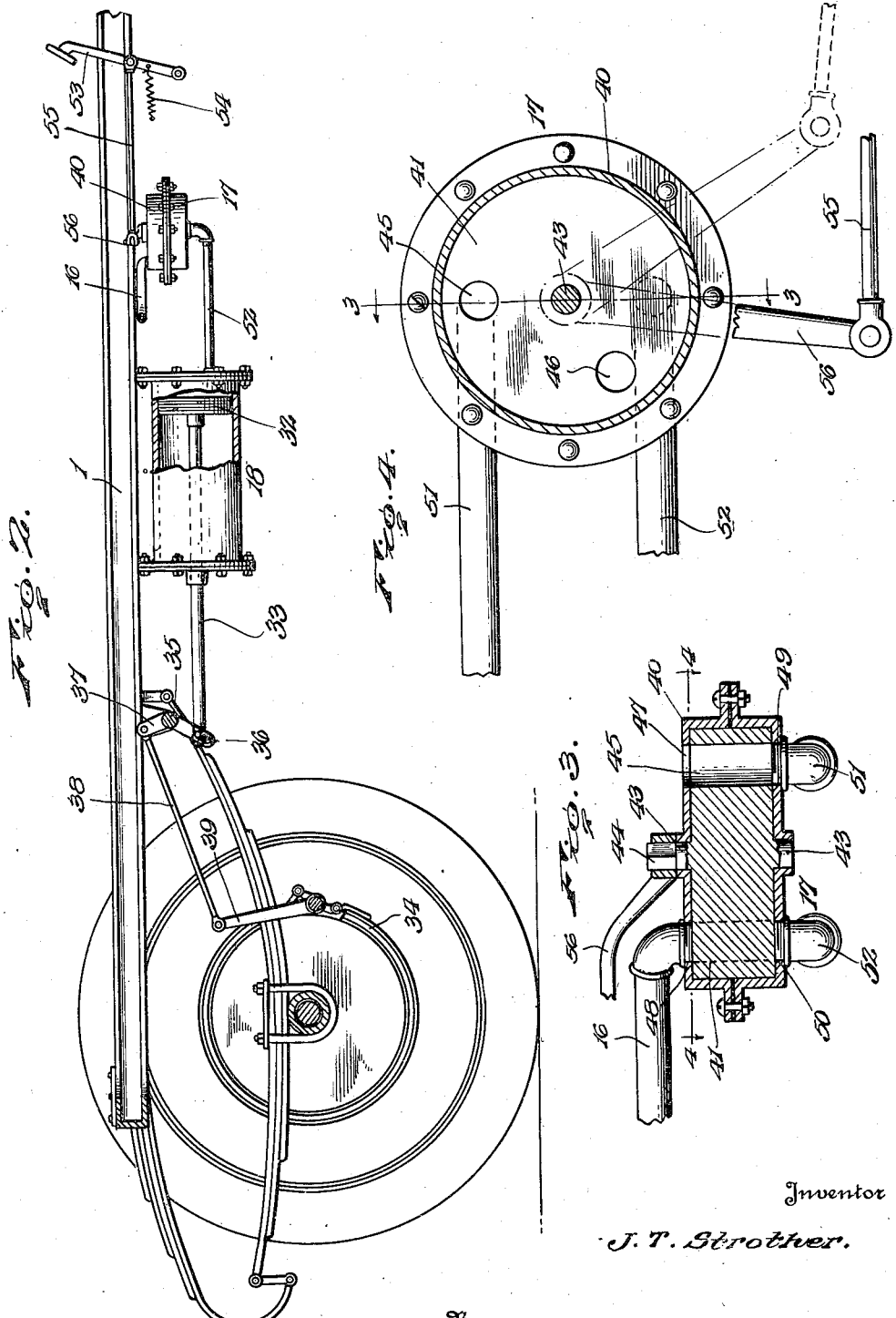

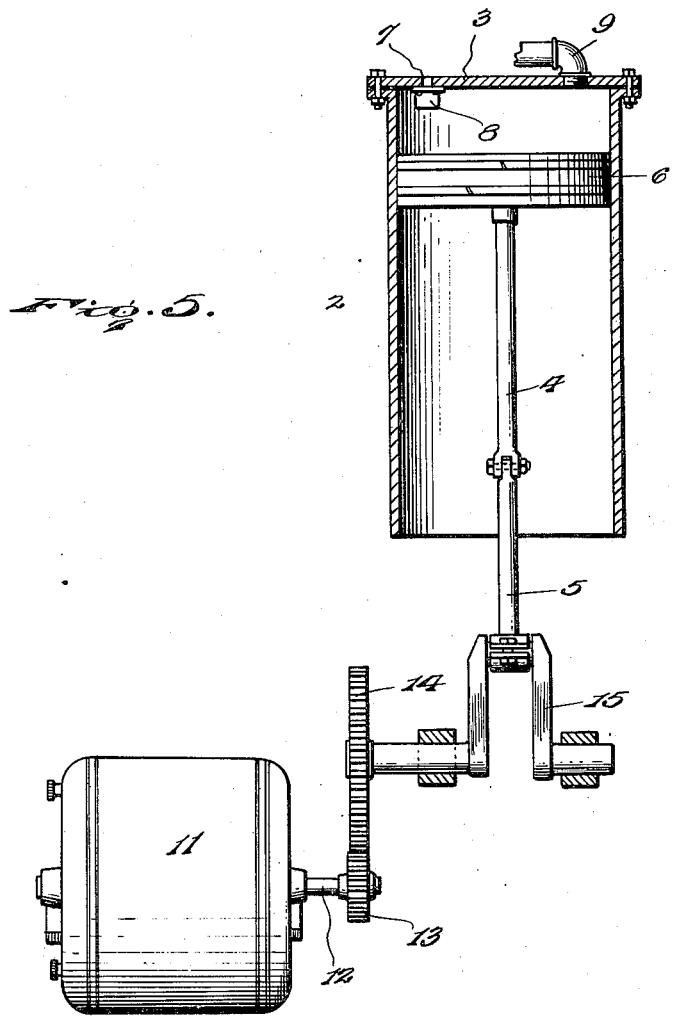
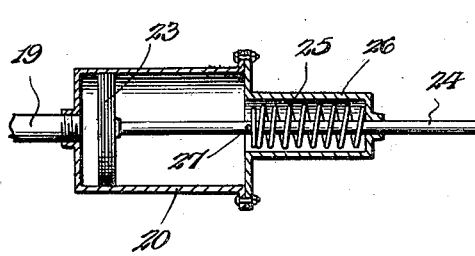
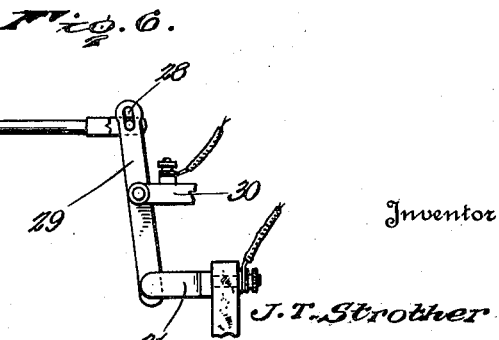

1,501,146

UNITED STATES PATENT OFFICE.

JOHN T. STROTHER, OF NOCAM, VIRGINIA.

AIR BRAKE FOR AUTOMOBILES.

Application filed December 4, 1923. Serial No. 678,518.

*To all whom it may concern:*

Be it known that I, JOHN T. STROTHER, a citizen of the United States, residing at Nocam, in the county of King George and State of Virginia, have invented certain new and useful Improvements in Air Brakes for Automobiles, of which the following is a specification.

This invention relates to automobile brakes and has for its object the provision of means whereby the brakes may be operated by fluid pressure through an apparatus of simple construction and arrangement which may be readily mounted upon the chassis of an automobile without necessitating any substantial changes in the construction of the chassis or rearrangement of the operating mechanism. The invention is illustrated in the accompanying drawings and will be hereinafter fully set forth.

In the drawings:

Figure 1 is a plan view of an automobile chassis having my improved brake mechanism mounted thereon;

Fig. 2 is a longitudinal vertical section on the line 2—2 of Fig. 1;

Fig. 3 is an enlarged section of the valve which controls the brake cylinder;

Fig. 4 is a view, partly in plan and partly in horizontal section, on the line 4—4 of Fig. 3, the line 3—3 in Fig. 4 indicating the plane of the section shown in Fig. 3;

Fig. 5 is an enlarged sectional elevation of the air compressor, and

Fig. 6 is a view, partly in plan and partly in horizontal section, of the governor cylinder and the parts associated therewith to control the motor.

The automobile chassis 1 may be of any well-known or preferred type and, in itself, forms no part of my invention. In carrying out my invention, I provide upon the chassis, preferably upon the forward portion thereof, an air compressor 2 which is shown most clearly in Fig. 5 and may consist of a cylindrical body having one end closed by a head 3 and its opposite end open to permit the passage and operation of a piston rod 4 and a connecting rod 5. A piston 6 of any preferred form is fitted within the cylinder and carried by the end of the piston rod 4, as shown clearly in Fig. 5 and as will be readily understood. The head 3 is provided with an inlet port 7 controlled by a check valve 8 which will open to admit air into the cylinder but close under back pressure to hold the air in the cylinder. A pipe 9 has one end fitted in the head 3, and this pipe extends to a storage tank or reservoir 10 which is suitably supported upon the chassis 1, a check valve 60 being provided in said pipe to prevent back flow from the reservoir. The compressor is driven by a motor 11 which is preferably an auxiliary electric motor connected electrically with the battery or the magneto of the automobile or, if preferred, connected with a separate source of electric energy. The source of energy, in itself, forms no part of my present invention and has been omitted from the drawings for the sake of clearness in the showing of the parts illustrated. The motor shaft 12 is equipped with a pinion 13 meshing with a gear 14 upon a crank shaft 15 and the connecting rod 5 is operatively connected with the crank of the said shaft. The rotation of the motor shaft will obviously rotate the crank shaft 15, and through the connecting rod 5 and the piston rod 4 the piston 6 will be reciprocated so that, upon its alternate strokes, air will be drawn into the cylinder and then forced out through the pipe 9 under pressure to flow into the storage tank or reservoir 10.

An outlet pipe 16 is fitted to the reservoir 10, and this pipe extends to a valve 17 which controls the brake cylinder 18, as will be presently more fully set forth. A branch 19 connects the pipe 16 with the governor cylinder 20 and, between the pipe 16 and the governor cylinder, a lateral branch pipe 21 leads to a pressure gage 22 which may be of any well-known form and may be mounted upon the instrument board of the vehicle or at any convenient point where the operator may easily read the gage so as to be informed of the degree of pressure within the storage tank or reservoir 10. Within the governor cylinder 20 is fitted a piston 23 which is snugly but slidably received in the cylinder, and a piston rod 24 extends from the said piston, a tension spring 25 being coiled around the piston rod within a reduced extension 26 of the governor cylinder, as shown in Fig. 6. The spring 25 bears at one end against the closed end or head of the reduced extension 26 and at its opposite end bears against a pin or other abutment 27 upon the piston rod so that the tension of the spring may be easily regulated to set the piston 23 for movement under any desired pressure, the tension of the spring being exerted constantly to hold the piston toward the inlet end of the governor cylinder. The outer end of the piston rod 24 has a pin and slot connection, as shown at 28, with one end of a switch lever 29, the said lever being fulcrumed between its ends upon a bracket 30 which forms a part of the circuit for operating the motor 11. A terminal 31 arranged in spaced relation to the bracket 30 also forms a part of the motor circuit, and this terminal 31 is normally engaged by the free end of the switch lever 29 so that the circuit will be closed and the motor operated. Obviously, the piston 23 is subjected to the same pressure which exists in the reservoir 10 and, when the said pressure exceeds the strength of the spring 25, the piston will be moved against the force of the spring, compressing the spring and swinging the switch lever 29 about its fulcrum so that its free end will be released from the terminal 31 and the motor circuit broken, whereupon the motor will cease to operate and the air compressor or pump 2 will, of course, remain at rest until such time as the pressure in the reservoir is reduced below that for which the spring 25 is set. When the pressure in the reservoir is thus reduced, the spring 25 will, of course, expand and return the switch lever 29 to its circuit-closing position, shown in Fig. 6, and the motor will then automatically operate the air compressor until the pressure in the reservoir has been restored to normal.

Within the brake cylinder 18 is mounted a piston 32 which is connected to a piston rod 33 extending through the rear end of the cylinder. The rear end of this piston rod 33 is connected through suitable intermediate devices with the brake 34, and these intermediate devices may be of any preferred type. I have shown a rock shaft 35 having a crank 36 connected with the piston rod 33 and having other cranks 37 connected by links 38 with the crank arms or levers 39 connected directly with the brake shoes or bands. The valve 17 comprises a circular casing 40 supported in any convenient manner upon the chassis of the automobile, and fitted closely but rotatably within the said casing 40 is a circular valve disc 41 fitting closely within the casing and provided centrally with trunnions 43 rotatably fitted in the heads of the casing, the upper trunnion terminating in an angular portion 44 adapted to be engaged by an operating lever or crank. The disc 41 is provided with ports 45 and 46 therethrough arranged on different radii of the disc, as shown clearly in Fig. 4. The valve casing is provided with ports 47 and 48 in its upper head which are disposed at diametrically opposite points of the valve, and one end of the pipe 16 is fitted in the port 48, as will be readily understood upon reference to Figs. 1, 2 and 3. In the lower head of the valve casing, ports 49 and 50 are arranged in axial alinement with the ports 47 and 48, respectively, and pipes 51 and 52 lead from the respective ports 49 and 50 into one end of the brake cylinder. A foot lever or pedal 53 controls the valve and is normally in retracted position under the influence of a spring, as 54. A link or connecting rod 55 is pivoted to and extends rearwardly from the lever or pedal 53 and the rear end of said connecting rod is pivoted to the outer end of a rocking arm or crank 56 which is fitted to the angular end 44 of the upper trunnion 43. The spring 54 may be arranged in any desired or preferred manner, and in actual practice, I generally employ the usual form of spring-retracted pedal now in use to control the brakes of automobiles.

Upon referring to Figs. 3 and 4, it will be noted that the exhaust port 45 in the valve disc is normally in axial alinement with the ports 47 and 49 in the casing so that the exhaust from the brake cylinder is open and the brakes are released. Normally, the flow of the air under pressure from the storage tank or reservoir will be blocked or prevented by a solid portion of the valve disc extending across the end of the pipe 16, as shown in Fig. 3. If it be desired to apply the brakes, the pedal 53 is pressed forwardly, thereby exerting a pull upon the crank or swinging arm 56 so that the valve disc will be rotated in the direction indicated by the arrows in Fig. 4 and the port 46 brought into axial alinement with the ports 48 and 50 and establish communication between the pipes 16 and 52, whereupon the air from the pipe 16 will at once flow through the alined ports into the pipe 52 and through the same to the brake cylinder 18. Inasmuch as the outlet from the cylinder through the pipe 50 is then closed by a solid portion of the valve disc, the compressed air entering the brake cylinder will drive the piston 32 rearwardly and set the brakes. When the pedal is returned to its initial normal position, the valve disc will obviously be returned to its normal position, bringing a solid portion of said valve across the end of the supply pipe 16 and bringing the port 45 into alinement with the end of the exhaust pipe 50 and the port 47 permitting the air to exhaust from the brake cylinder and releasing the brakes.

From the foregoing description, taken in connection with the accompanying drawings, it will be seen that I have provided a very simple, compact and efficient apparatus whereby the brakes of an automobile may be applied by compressed air and the pressure automatically maintained at the proper strength. The installation of my apparatus does not require any structural changes in the chassis nor any rearrangement of any of the mechanism by which the automobile is driven.

Having thus described the invention, I claim:

1. In an air brake apparatus for automobiles, the combination of a reservoir, a brake cylinder, means for maintaining pressure in the reservoir, a controlling valve disposed between the reservoir and the brake cylinder, a piston within the brake cylinder, operative connections whereby movement of said piston in one direction will apply brakes and in the opposite direction will release brakes, a supply pipe reaching from the reservoir to one side of the controlling valve, supply and exhaust pipes leading from the brake cylinder to the opposite side of the controlling valve, and means for operating said valve.

2. In an air brake apparatus for automobiles, a controlling valve comprising a casing having ports in its upper and lower sides, a main supply pipe having its end fitted in one of the ports in the upper side of the casing, a brake cylinder, pipes having their ends fitted in the ports in the lower side of the valve casing and connected with the brake cylinder, a valve disc arranged within the valve casing and provided with spaced ports, and an operating pedal operatively connected with said valve disc whereby to establish flow from the main supply pipe to the brake cylinder or cut-off the said flow and to establish flow from the brake cylinder through the valve casing to the open air or cut-off said flow.

3. In an air brake apparatus for automobiles, the combination of a valve casing having spaced ports in its top and bottom, one of the ports in the top of the casing being constantly open, a main supply pipe connected with the other port in the top of the valve casing, pipes connected with the ports in the bottom of the valve casing and extending to a brake cylinder, a valve disc rotatably mounted within the valve casing and provided with an inlet port and an exhaust port therethrough, said ports being spaced apart a less distance than the corresponding ports in the valve casing, and means for adjusting said valve whereby the ports therein may be brought into alinement with and establish communication between the main supply pipe and the pipe leading into the brake cylinder or to cut-off said communication and establish communication between the pipe leading from the brake cylinder and the constantly open port in the top of the valve casing.

4. In an air brake apparatus for automobiles, a valve casing having ports in its top and bottom, one of the ports in the top of the casing being constantly open, a main supply pipe fitted to the other port in the top of the casing, pipes extending from the ports in the bottom of the casing to the brake cylinder, a valve disc rotatably mounted within the valve casing and having vertically projecting studs extending, respectively, through the top and bottom of the valve casing at the center of the same, an operating pedal, a swinging arm upon the upper stud of the valve disc, and connections between said swinging arm and the pedal whereby the valve disc may be operated, the valve disc being provided with ports therethrough so arranged that the inlet ports of the casing may be brought into communication and the outlet ports may be brought into communication but the outlet ports and the inlet ports cannot be in communication simultaneously.

In testimony whereof I affix my signature.

JOHN T. STROTHER. [L. S.]